United States Patent
Sun et al.

(10) Patent No.: US 8,259,642 B2
(45) Date of Patent: Sep. 4, 2012

(54) METHOD AND APPARATUS FOR REALIZING SPACE DIVISION MULTIPLEXING

(75) Inventors: Changguo Sun, Beijing (CN); Yingmin Wang, Beijing (CN); Shiqiang Suo, Beijing (CN); Shaohui Sun, Beijing (CN)

(73) Assignee: China Academy Of Telecommunications Technology, Beijing (CN)

( * ) Notice: Subject to any disclaimer, the term of this patent is extended or adjusted under 35 U.S.C. 154(b) by 179 days.

(21) Appl. No.: 12/531,589

(22) PCT Filed: Mar. 7, 2008

(86) PCT No.: PCT/CN2008/070442
§ 371 (c)(1),
(2), (4) Date: Feb. 16, 2010

(87) PCT Pub. No.: WO2008/113281
PCT Pub. Date: Sep. 25, 2008

(65) Prior Publication Data
US 2010/0142390 A1    Jun. 10, 2010

(30) Foreign Application Priority Data

Mar. 16, 2007  (CN) .......................... 2007 1 0064503

(51) Int. Cl.
*H04B 7/204*  (2006.01)
*H04B 7/216*  (2006.01)
*H04B 7/212*  (2006.01)
*H03K 9/00*   (2006.01)
*H04L 27/06*  (2006.01)
*H03D 1/04*   (2006.01)

(52) U.S. Cl. ........ 370/319; 370/320; 370/321; 375/316; 375/340; 375/346

(58) Field of Classification Search .................. 375/316, 375/346, 347, 340; 370/319–321
See application file for complete search history.

(56) References Cited

U.S. PATENT DOCUMENTS

| | | | |
|---|---|---|---|
| 7,778,211 B2 * | 8/2010 | Hedayat et al. | 370/310 |
| 2004/0022205 A1 * | 2/2004 | Miyata et al. | 370/319 |
| 2005/0213556 A1 * | 9/2005 | Wax et al. | 370/349 |
| 2006/0211441 A1 * | 9/2006 | Mese et al. | 455/522 |
| 2006/0251061 A1 * | 11/2006 | Kim et al. | 370/366 |
| 2007/0010203 A1 * | 1/2007 | Wee et al. | 455/63.1 |
| 2007/0195906 A1 * | 8/2007 | Kim et al. | 375/267 |

* cited by examiner

*Primary Examiner* — Brandon Renner
(74) *Attorney, Agent, or Firm* — Hoffmann & Baron, LLP (57) ABSTRACT

A method for realizing space division multiplexing is provided. The method comprises steps as follows: A. acquiring space information of users, and calculating space division isolation between the users based on the acquired space information; B. generating a set of user groups for the space division multiplexing based on the space division isolation between users calculated in step A; C. selecting a user group from the set of user groups for the space division multiplexing generated in step B and allocating the same physical resource to two users among the selected user group when conducting the space division multiplexing. An apparatus for realizing space division multiplexing is further provided. Using said method and apparatus, the space division isolation can be realized reasonably with accuracy.

11 Claims, 2 Drawing Sheets

METHOD AND APPARATUS FOR REALIZING SPACE DIVISION MULTIPLEXING

TECHNICAL FIELD

The present invention relates to multiplexing technique in mobile communication system, especially relates to method and apparatus for realizing space division multiplexing.

BACKGROUND ART

With increase of the number of users in mobile communication system, how to utilize radio spectrum resources more sufficiently and better becomes an important problem to be solved, and now the most commonly used mode is resource multiplexing. In the available mobile communication system, basic radio spectrum resources usually include frequency resources, time resources and code resources, and correspondingly, frequency division multiplexing (FDM), time division multiplexing (TDM), code division multiplexing (CDM), or their combination can be carried out based on those basic radio spectrum resources.

Since the 90s, beamforming techniques are applied broadly in the mobile communication system, and the beamforming technique is significantly applied in two aspects: one is to improve the signal-to-interference ratio of desired user directly by beamforming so as to improve the performance of system or spectrum efficiency; and the other is to multiplex limited spectrum resources by beamforming. Array antenna adopting beamforming technique is usually called smart antenna which aims the main beam to the desired user to perform receiving and transmitting by beamforming, so that the received power of desired signals is increased. The smart antenna may also aim the nulls steering of the array antenna pattern to an interfering user according to space characteristic of the interfering signal by adjusting weighting coefficient of each antenna unit, so that the power of signal from (to) the interfering user is reduced.

Based on beamforming and smart antenna techniques, the concept of space division multiplexing (SDM) brings out in the field of the resource multiplexing. The so-called space division multiplexing refers to the form of multiplexing basic radio spectrum resource unit on the basis of the modes of frequency division multiplexing, time division multiplexing and code division multiplexing by using beamforming techniques of the smart antenna, for instance: different beams are multiplexed in different spatial layers. The basic mind of space division multiplexing is minimizing the interference received between two user's signals when the base station receives signals or minimizing signal of the other user contained in the signal received by any one of the two users when the base station transmits signals, by orthogonalizing channels of two users multiplexing a single radio resource.

However, in the current available solution, only the method for performing interference suppression between two users multiplexing a single resource by beamforming is provided, wherein the interference suppression is performed by aiming the main beam to the desired user and aiming nulls steering to the interfering user by beamforming based on space information of the desired user and the interfering users. However, the performance and effect of the interference suppression between two users cannot be ensured, it totally depends upon beamforming algorithm. Especially, the downlink beamforming is further influenced by error introduced by the beamforming delay. Evidently, the prior art fails to definitely provide a method for realizing space division multiplexing and fails to suggest how to ensure the effect and accuracy of space division multiplexing.

SUMMARY OF THE INVENTION

In consideration of the above mentioned, the main object of the present invention is to provide a method and an apparatus for realizing space division multiplexing, which are able to realize space division multiplexing reasonably with accuracy.

In order to achieve the above mentioned object, the technical solution of the present invention is carried out as follows:

A method for realizing space division multiplexing, the method comprises steps as follows:

A. acquiring space information of users, and calculating space division isolation between the users based on the acquired space information;

B. generating a set of user groups for the space division multiplexing based on the space division isolation between users calculated in step A;

C. selecting a user group from the set of user groups for the space division multiplexing generated in step B and allocating the same physical resource to two users among the selected user group when conducting the space division multiplexing.

Wherein the users are two users; the space information is space covariance matrix; and the space division isolation includes an uplink space division isolation and a downlink space division isolation;

The calculation of space division isolation between the users in step A refers to calculating the space division isolation between the users based on capability of interference suppression, specifically including steps as follows:

A11. calculating beamforming weight coefficient $w_{m,n}$ of a user m for suppressing a user n;

A12. calculating the uplink space division isolation and downlink space division isolation respectively by the formulae $$\Upsilon_{m,n}^{(1)} = \frac{\overline{p}_{m,m}}{\overline{p}_{m,n}} = \frac{\overline{w}^{(m,n)H}\overline{R}_{xx}^{(m)}\overline{w}^{(m,n)}}{\overline{w}^{(m,n)H}\overline{R}_{xx}^{(n)}\overline{w}^{(m,n)}} \text{ and}$$

$$\underline{\Upsilon}_{m,n}^{(1)} = \frac{\underline{p}_{m,m}}{\underline{p}_{m,n}} = \frac{\underline{w}^{(n,m)H}\underline{R}_{xx}^{(m)}\underline{w}^{(n,m)}}{\underline{w}^{(m,n)H}\underline{R}_{xx}^{(m)}\underline{w}^{(m,n)}}$$

based on the beamforming weight coefficient calculated in step A11 and estimated channel impulse response; wherein $\overline{p}_{m,n}$ represents signal power transmitted by user n and received by the base station with beamforming when the base station is receiving signal from user m, $\overline{p}_{m,m}$ represents signal power transmitted by the user m and received by base station when the base station is receiving signals from the user m with beamforming, $\underline{p}_{m,n}$ represents signal power transmitted by the base station to the user n and received by a terminal of the user m, and $\underline{p}_{m,m}$ represents signal power received by base station when the base station is receiving signals from the terminal of the user m with beamforming;

and the generation of the set of user groups for the space division multiplexing in step B is obtained statistically based on $$\begin{cases} \overline{\Omega}^{(1)} = \left\{ \forall \ (m,n) \mid_{(|\overline{\Upsilon}_{m,n}^{(1)} \geq \Gamma^{(1)} \& \overline{\Upsilon}_{n,m}^{(1)} \geq \Gamma^{(1)}),m,n=1,\ldots,K\&m\neq n)} \right\} \\ \underline{\Omega}^{(1)} = \left\{ \forall \ (m,n) \mid_{(|\underline{\Upsilon}_{m,n}^{(1)} \geq \Gamma^{(1)} \& \underline{\Upsilon}_{n,m}^{(1)} \geq \Gamma^{(1)}),m,n=1,\ldots,K\&m\neq n)} \right\} \end{cases}$$

wherein ∀ represents all elements satisfying conditions $\overline{\Upsilon}_{m,n}^{(1)}, \overline{\Upsilon}_{n,m}^{(1)}, \underline{\Upsilon}_{m,n}^{(1)}, \underline{\Upsilon}_{n,m}^{(1)}$ represent respectively uplink space division isolation of the user m to the user n, uplink space division isolation of the user n to the user m, downlink space division isolation of the user m to the user n, downlink space division isolation of the user n to the user m; and $\overline{\Gamma}^{(1)}$, $\underline{\Gamma}^{(1)}$ represent respectively uplink space division isolation threshold and downlink space division isolation threshold.

The users are two users; and the calculation of the space division isolation between users in step A refers to calculating the space division isolation between users based on power spectrum of user space, specifically including steps as follows:

A21. estimating power spectrum of each user;
A22. calculating power spectrum difference between the two users based on the formula $$\Delta \overline{p}_{m,n}(\varphi) = \begin{cases} \overline{p}_m(\varphi) - \overline{p}(\varphi), & \text{if } \overline{p}_m(\varphi) \geq \overline{\varepsilon}_p \ \& \ \overline{p}_n(\varphi) \geq \overline{\varepsilon}_p \\ \overline{p}_m(\varphi), & \text{if } \overline{p}_m(\varphi) \geq \overline{\varepsilon}_p \ \& \ \overline{p}_n(\varphi) < \overline{\varepsilon}_p \\ \overline{p}_n(\varphi), & \text{if } \overline{p}_m(\varphi) < \overline{\varepsilon}_p \ \& \ \overline{p}_n(\varphi) \geq \overline{\varepsilon}_p \\ 0, & \text{if } \overline{p}_m(\varphi) < \overline{\varepsilon}_p \ \& \ \overline{p}_n(\varphi) < \overline{\varepsilon}_p, \end{cases}$$

wherein $\overline{\varepsilon}_p$ is calculation threshold of the power spectrum difference;

A23. calculating the space division isolation between the users based on the formula $$\overline{\Upsilon}_{m,n}^{(2)} = \int |\Delta \overline{p}_{m,n}(\varphi)| d\varphi;$$

and the generation of the set of the user group for space division multiplexing in step B is obtained statistically based on $$\begin{cases} \overline{\Omega}^{(2)} = \left\{ \forall \ (m,n) \mid_{(|\overline{\Upsilon}_{m,n}^{(2)} \geq \Gamma^{(2)}),m,n=1,\ldots,K)} \right\} \\ \underline{\Omega}^{(2)} = \left\{ \forall \ (m,n) \mid_{(|\underline{\Upsilon}_{m,n}^{(2)} \geq \Gamma^{(2)}),m,n=1,\ldots,K)} \right\} \end{cases} \text{ or }$$

$$\begin{cases} \overline{\Omega}^{(2)} = \left\{ \forall \ (m,n) \mid_{(|\overline{\Upsilon}_{m,n}^{(2)} \geq \Gamma^{(2)} \& |\overline{p}_m-\overline{p}_n|\leq \delta_p),m,n=1,\ldots,K)} \right\} \\ \underline{\Omega}^{(2)} = \left\{ \forall \ (m,n) \mid_{(|\underline{\Upsilon}_{m,n}^{(2)} \geq \Gamma^{(2)} \& |\underline{p}_m-\underline{p}_n|\leq \delta_p),m,n=1,\ldots,K)} \right\} \end{cases}$$

wherein $\overline{\Upsilon}_{m,n}^{(2)}, \underline{\Upsilon}_{m,n}^{(2)}$ represent respectively uplink space division isolation of the user m to the user n or the same of the user n to the user m and downlink space division isolation of the user m to the user n or the same of the user n to the user m.

The users are two users; and the calculation of the space division isolation between the users in step A refers to calculating the space division isolation between the users based on user's direction of arrival, specifically including steps as follows:

A31. estimating power spectrum of each user;
A32. determining the direction in which the maximum value of power spectrum lies as the user's direction of arrival;
A33. calculating angle difference of arrival between the two users as the space division isolation between the users;

and the generation of the set of user groups for the space division multiplexing in step B is obtained statistically based on $$\begin{cases} \overline{\Omega}^{(3)} = \left\{ \forall \ (m,n) \mid_{(|\overline{\Upsilon}_{m,n}^{(3)} \geq \Gamma^{(3)}),m,n=1,\ldots,K)} \right\} \\ \underline{\Omega}^{(3)} = \left\{ \forall \ (m,n) \mid_{(|\underline{\Upsilon}_{m,n}^{(3)} \geq \Gamma^{(3)}),m,n=1,\ldots,K)} \right\} \end{cases} \text{ or }$$

$$\begin{cases} \overline{\Omega}^{(3)} = \left\{ \forall \ (m,n) \mid_{(|\overline{\Upsilon}_{m,n}^{(3)} \geq \Gamma^{(3)} \& |\overline{p}_m-\overline{p}_n|\leq \delta_p),m,n=1,\ldots,K)} \right\} \\ \underline{\Omega}^{(3)} = \left\{ \forall \ (m,n) \mid_{(|\underline{\Upsilon}_{m,n}^{(3)} \geq \Gamma^{(3)} \& |\underline{p}_m-\underline{p}_n|\leq \delta_p),m,n=1,\ldots,K)} \right\} \end{cases},$$

The users are multiple users; and the calculation of the space division isolation between users in step A refers to calculating the space division isolation between the users based on capability of interference suppression, specifically including steps as follows:

A41. calculating beamforming weight coefficient of each user for suppressing the other users;
A42. calculating the uplink space division isolation or downlink space division isolation respectively, based on the beamforming weight coefficient calculated in step A41 and the obtained channel impulse response.

In the above mentioned solution, the space information in step A is space covariance matrix; the space covariance matrix includes uplink space covariance matrix $\overline{R}_{xx}^{(k)}$ and downlink space covariance matrix $\underline{R}_{xx}^{(x)}$ which are calculated respectively based on $\overline{R}_{xx}^{(k)} = E\{\overline{H}^{(k)}\overline{H}^{(k)H}\}$ and $\underline{R}_{xx}^{(k)} = E\{\underline{H}^{(k)}\underline{H}^{(k)H}\}$, wherein $E\{\bullet\}$ represents taking an average value of random variables, $(\bullet)^H$ represents conjugating and transposing the matrix.

In the above mentioned solution, the space information in step A is space covariance matrix; the space covariance matrix includes uplink space covariance matrix $\overline{R}_{xx}^{(k)}$ and downlink space covariance matrix $\underline{R}_{xx}^{(k)}$; the uplink space covariance matrix $\overline{R}_{xx}^{(k)}$ is calculated based on $\overline{R}_{xx}^{(k)} = E\{\overline{R}^{(k)} \overline{R}^{(k)H}\}$;

the downlink space covariance matrix $\underline{R}_{xx}^{(k)}$ is calculated based on $$\underline{R}_{xx}^{(k)} = E\{H^{(K)}H^{(k)H}\}/G_k \text{ or } \underline{R}_{xx}^{(k)} = \frac{\underline{p}_k}{\overline{p}_k} E\{H^{(k)}H^{(k)H}\},$$

wherein $G_k$ is automatic gain control coefficient of a user k, $\overline{p}_k$ is uplink transmit power of the user k, and $\underline{p}_k$ is downlink transmit power of the user k.

In the above mentioned solution, the generation of the set of user groups for the space division multiplexing in step B refers to: traversing all users covered by the current base station, calculating the space division isolation between each two users, determining all user groups in which the space divisional multiplexing is capable of being carried out by comparing the calculated space division isolation with a predetermined space division isolation threshold, and constituting the set of user groups for the space division multiplexing; or refers to: by triggering events, traversing part of users covered by the current base station starting from a random user, calculating the space division isolation between users, determining user groups in which space divisional multiplexing is capable of being carried out by comparing the calculated space division isolation with a predetermined space division isolation threshold, so as to constitute the set of user groups for the space division multiplexing.

The method further comprises: updating the set of user groups for the space division multiplexing in real time or periodically.

In the above mentioned solution, the method further comprises: predetermining uplink and downlink space division isolation thresholds $\Gamma^{(p)}$, p=1, 2, 3 and $\overline{\Gamma}^{(p)}$, p=1, 2, 3, wherein p is index of the selected space division isolation calculation method; and the space division isolation thresholds are ratios of power, absolute power values, or angles of arrival.

In the above mentioned solution, the method further comprises: setting different uplink and downlink space division isolation thresholds $\Gamma^{(p,k)}$, p=1, 2, 3; k=1, ..., K and $\overline{\Gamma}^{(p,k)}$, p=1, 2, 3; k=1 ... K for different terminals, wherein p is index of the selected space division isolation calculation method, k is user number; and the space division isolation thresholds are ratios of power, absolute power values, or angles of arrival.

Wherein the generation of the set of user groups for the space division multiplexing in step B refers to: the generation based on $$\begin{cases} \Omega^{(p)} = \left\{ \forall\, (m,n)\, |_{(\Gamma^{(p)}_{m,n} \geq \Gamma^{(p,m)} \& \Gamma^{(p)}_{n,m} \geq \Gamma^{(p,n)}), m,n=1,\ldots,K \& m\neq n} \right\} \\ \overline{\Omega}^{(p)} = \left\{ \forall\, (m,n)\, |_{(\overline{\Gamma}^{(p)}_{m,n} \geq \overline{\Gamma}^{(p,m)} \& \overline{\Gamma}^{(p)}_{n,m} \geq \overline{\Gamma}^{(p,n)}), m,n=1,\ldots,K \& m\neq n} \right\} \end{cases},$$

$$p = 1, 2, 3$$

An apparatus for realizing space division multiplexing comprises: antenna unit, channel estimation unit, space information acquiring unit, space division isolation calculation unit, space division multiplexing user group generation unit, and resource allocation unit; wherein the antenna unit is configured to receive radio signals; the channel estimation unit calculates uplink or downlink channel impulse response of the corresponding user based on the received signal and sends the calculation result to the space information acquiring unit; the space information acquiring unit calculates uplink or downlink space covariance matrices of the users based on the received channel impulse response; the space division isolation calculation unit calculates space division isolation between the users based on the acquired space covariance matrix; the space division multiplexing user group generation unit determines user groups in which space divisional multiplexing is capable of being carried out based on the space division isolation between the users calculated by the space division isolation calculation unit and a predetermined space division isolation threshold, so as to constitute the set of user groups for the space division multiplexing; the resource allocation unit is configured to select user group from the space division multiplexing use group generation unit and allocate share radio resource to the selected user.

In the above mentioned solution, the space division isolation calculation unit further comprises beamforming weight coefficient calculation unit, uplink space division isolation calculation unit, and downlink space division isolation calculation unit; wherein the beamforming weight coefficient calculation unit is configured to calculate beamforming weight coefficient of a user for suppressing another user and send the calculated beamforming weight coefficient respectively to the uplink space division isolation calculation unit and the downlink space division isolation calculation unit; the uplink space division isolation calculation unit calculates uplink space division isolation between the users based on the obtained beamforming weight coefficient and channel impulse response; the downlink space division isolation calculation unit calculates downlink space division isolation between the users based on the obtained beamforming weight coefficient and channel impulse response.

Or the space division isolation calculation unit further comprises power spectrum estimation unit, power spectrum difference calculation unit, and space division isolation calculation module; wherein the power spectrum estimation unit is configured to accomplish power spectrum estimation; the power spectrum difference calculation unit calculates power spectrum difference between two users based on the estimated power spectrum of each user; the space division isolation calculation module calculates space division isolation between two users based on the calculated power spectrum difference.

Or the space division isolation calculation unit further comprises power spectrum estimation unit, direction of arrival determination unit, and angle difference of arrival calculation unit; wherein the power spectrum estimation unit is configured to accomplish power spectrum estimation; the direction of arrival determination unit determines the direction in which the maximum value of power spectrum lies as corresponding user's direction of arrival based on result of the power spectrum estimation; the angle difference of arrival calculation unit is configured to calculate angle difference of arrival between the two users and take the calculation result as the space division isolation of the two users.

In the above mentioned solution, the antenna unit is antenna of base station or receiving unit of mobile terminal. The space information acquiring unit further comprises uplink space covariance matrix calculation unit and downlink space covariance matrix calculation unit, respectively for calculating uplink and downlink space covariance matrixes.

In the above mentioned solution, the space division multiplexing user group generation unit further comprises space division isolation comparison unit and space division multiplexing user group storage unit; wherein the space division isolation comparison unit is configured to receive the space division isolation between the users calculated by the space division isolation calculation unit and, at the same time, receive or read the space division isolation threshold, compare the two values and send the user group whose space division isolation larger than or equal to the threshold to the space division multiplexing user group storage unit for saving; the space division multiplexing user group storage unit is configured to save all user groups having been compared and whose space division isolation larger than or equal to the space division isolation threshold, so as to constitute the set of the user groups for the space division multiplexing.

The apparatus further comprises space division multiplexing user group updating unit for updating the set of the user groups for the space division multiplexing in real time or periodically as required.

In the method and apparatus for realizing space division multiplexing provided in the present invention, the set of user groups for the space division multiplexing is constituted by calculating space division isolation between two users or more than two users, and suitable user group is selected from the constituted set when performing space division multiplexing, and radio resources are allocated to the selected users. Thus, the space division multiplexing is performed between users reasonably with accuracy.

In the present invention, multiple different modes could be adopted for realizing how to calculate space division isolation between users, more particularly, three methods for space division multiplexing pre-grouping based on channel estimation are provided, so that the scope of application is broader and the calculating mode is more flexible and comprehensive. Wherein the solution for calculating space division isolation based on capability of interference suppression suggests a method for calculating space division isolation in the case of optional beamforming. Even in the case of beamforming without interference suppression, it is still possible to perform space division multiplexing. Combing said method directly with the beamforming algorithm, it represents interference suppression realizable by receiving/transmitting beamforming, which provides most direct reference for the space division multiplexing. Moreover, regarding the calculation of space division isolation between users, several differences under different factors and different conditions are further taken in consideration in the present invention, for instance: definite and specific calculation modes are provided respectively for a power control system and a system without power control as well as for two users and multiple users, so that the realization of space division multiplexing is more perfect, more exact, and more reasonable.

In the present invention, in construction of user group list for space division multiplexing, the mode of traversing all users and calculating space division isolation between all users can be used to obtain a complete user group list for space division multiplexing; it is also allowed to select part of users as required when an event is triggered and calculate space division isolation between the selected users, so as to obtain an incomplete user group list for space division multiplexing, thereby the operation is convenient and flexible.

MODE OF CARRYING OUT THE INVENTION

The core idea of the present invention is: to perform estimation of capability of interference suppression to all users covered by a certain base station, and to select two or more users to share a single basic radio resource based on the result of estimation. More particularly, on the basis of channel estimation of users, a set of user groups for the space division multiplexing is constituted by calculating space division isolation between two or more than two users, and a suitable user group is selected from the constituted set when space division multiplexing is performed, and share radio resources are allocated to the users selected, wherein the basic radio resources include frequency band, time slot, and code etc.

To describe the basic flow of the present invention, it is supposed in the following that channel information of all users covered by the base station is known, the supposal is realizable for the current mobile communication system.

Figure 1:
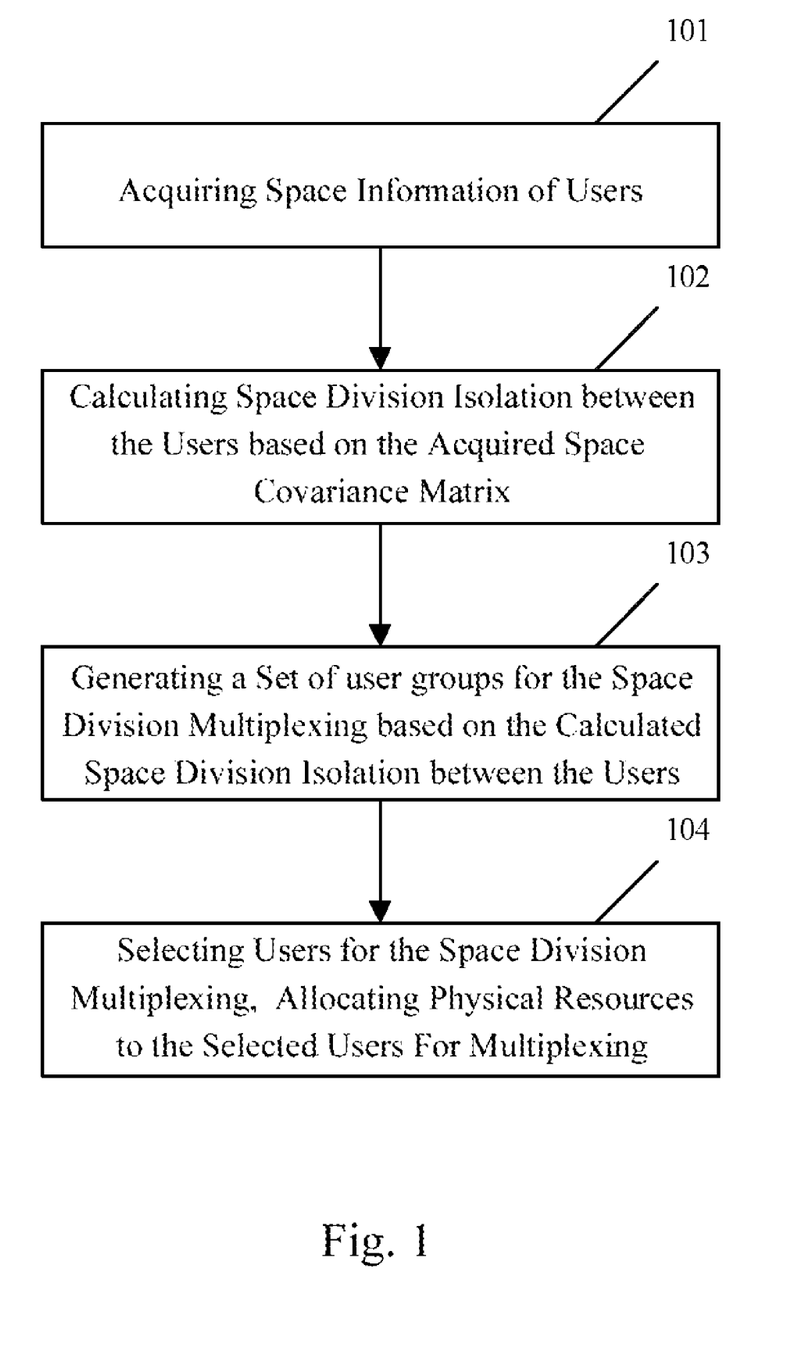
FIG. 1 is a schematic diagram of realization flow of the space division multiplexing method according to the present invention.

The method for realizing space division multiplexing of the present invention as shown FIG. 1 comprises the following steps:

Step 101: acquiring space information of users.

In the present invention, the most basic characteristic value of the space information is space covariance matrix. Thus, acquiring the space information of user just refers to calculating space covariance matrix of users.

Supposed there are K users covered by an optional base station A, multi-antennae uplink and downlink channel pulse responses of each user are estimated respectively as: $\overline{H}^{(k)}$, k=1, ..., K and $H^{(k)}$, k=1, ..., K, wherein k is index of the user. Based on the channel pulse responses of the user, uplink and downlink space covariance matrixes of the user are obtained as: $\overline{R}_{xx}^{(k)} = E\{\overline{H}^{(k)}\overline{H}^{(k)H}\}$ and $R_{xx}^{(k)} = E\{H^{(k)}H^{(k)H}\}$, wherein $E\{\cdot\}$ represents taking an average value of random variables, $(\cdot)^H$ represents conjugating and transposing the matrix, which would be commonly known for the person skilled in the art.

Generally speaking, regarding a time division duplex (TDD) system, as identical frequency is used in uplink and downlink, the uplink and downlink space covariance matrixes are identical, i.e. $\overline{R}_{xx}^{(k)} = R_{xx}^{(k)}$. Then, the channel pulse response of the user can be estimated directly by user signals received from the base station. Regarding a frequency division duplex (FDD) system, uplink is obtainable directly by using multi-antennae channel at the base station side, and in downlink multi-antennae channel the pulse response of the user can be obtained by the feedback of user terminals, or approximated by means of some variants of the estimation result of the uplink channel. How to obtain or calculate specifically belongs to commonly know technique and will not be described repeatedly here.

Step 102: calculating space division isolation between the users based on the acquired space covariance matrix.

In the present invention, the space division isolation refers to degree of spatial differentiation of two users, the specific definition thereof and mode for realizing it may be different owing to the realization difference of the systems.

Usually the definition and calculation of space division isolation can be performed based on capability of interference suppression, the definition and calculation of space division isolation can also be performed based on space power spectrum of the users, and the definition and calculation of space division isolation can further be performed based on user's direction of arrival, and so on. Moreover, in the calculation, the case of merely considering two users is also different from that of considering multiple users. How to define and calculate to obtain the space division isolation specifically using each mode will be described in detail in the following text.

While calculating the space division isolation, the adopted definition and calculation mode are also different owing to the difference of the environment for application, for instance: the calculation mode of the space division isolation is different between a system without power control and a power control system. How to define and calculate to obtain the space division isolation specifically in different systems will also be described in detail in the following text.

Step 103: generating a set of user groups for the space division multiplexing based on the calculated space division isolation between the users.

More particularly, in this step the space division isolation between the users calculated in Step 102 is compared with a predetermined space division isolation threshold. If it is larger than or equal to the space division isolation threshold, the two users are able to share a single physical resource. Then, said two users constitute a user group for the space division multiplexing; else, they cannot share a single physical resource.

The space division isolation threshold includes uplink space division isolation threshold and downlink space division isolation threshold. Thus, in order to judge whether the two users can multiplex uplink physical resource or downlink physical resource, it is necessary to conduct comparison respectively with the uplink space division isolation threshold and the downlink space division isolation threshold, the physical resource that satisfies the condition will be multiplexed.

In the present invention, since two or more users multiplex completely identical physical resource in the space division multiplexing system, it is required that the two users can conduct space multiplexing of corresponding physical resource only when they satisfies a certain spatial isolation therebetween.

Generally, the uplink and downlink space division isolation thresholds $\overline{\Gamma}^{(p)}$, p=1, 2, 3 and $\underline{\Gamma}^{(p)}$, p=1, 2, 3 for multiplexing are predetermined according to experiments, simulations or practical tests, wherein p is index of the selected space division isolation calculation method. As the interference between the two users sharing a single physical resource is mutual, when both uplink isolations of the two users are larger than or equal to the uplink space division isolation threshold $\underline{\Gamma}^{(p)}$, the two users could share a single uplink physical resource, i.e. they conduct uplink space division multiplexing. Thus, said two users constitute a user group for uplink space division multiplexing; likewise, when both downlink isolations of the two users are larger than or equal to the downlink space division isolation threshold $\overline{\Gamma}^{(p)}$, the two users could share a single downlink physical resource, i.e. they conduct downlink space division multiplexing. Thus, said two users constitute a user group for downlink space division multiplexing. The physical meaning and setting of the thresholds are different for adopting different space division isolation calculation methods. The corresponding thresholds need to be determined respectively by analysis, simulations, experiments or practical tests. How to generate the user group for space division multiplexing specifically when different calculation modes for space division isolation are used will be described in detail in the following text by combining with the different calculation modes for space division isolation.

In the present invention, space division isolations of all the users covered by the current base station A are respectively calculated, and then, all the calculated space division isolations are compared with the space division isolation thresholds one by one, so that all user groups in which space division multiplexing can be conducted are determined All the user groups, in which space division multiplexing can be conducted, constitute a set of user groups for the space division multiplexing, that set may be a set of user groups for uplink space division multiplexing or a set of user groups for downlink space division multiplexing. That set can be represented in the form of a list, both Table 1 and Table 2 are lists of user groups for space division multiplexing when the number of users satisfying the condition is N, wherein two users are considered to conduct the space division multiplexing in each group of Table 1, and multiple users are considered to conduct the space division multiplexing in each group of Table 2.

TABLE 1

| Index of Group | User Group for Space Division Multiplexing |
|---|---|
| 1 | $m_1, n_1$ |
| 2 | $m_2, n_2$ |
| ... | ... |
| N | $m_N, n_N$ |

TABLE 2

| Index of Group | User Group for Space Division Multiplexing |
|---|---|
| 1 | $m_1, n_1, l_1$ |
| 2 | $m_2, n_2, l_2$ |
| ... | ... |
| N | $m_N, n_N, l_N$ |

The list of user groups for space division multiplexing can be calculated and updated in real time, and may also be updated periodically according to stability of user's spatial characteristic, for instance, the list can be updated in each frame or in a certain time interval.

Step 104: while conducting space division multiplexing, selecting a user group from the set of user groups for the space division multiplexing generated in Step 103 to conduct space division multiplexing, i.e.: allocating the same physical resource to the two users in the selected user group.

In the present invention, when the list of user groups for the space division multiplexing is constructed based on space division isolation calculated by interference suppression or other depending upon forming weight coefficient, the beamforming weight coefficient for conducting the space division multiplexing should be identical to the beamforming weight coefficient for calculating the space division isolation.

In this step, the selection of user group can be carried out in multiple modes, for instance: optional selection, or preferably selecting user group having large space division isolation, in such case, it is necessary to store the space division isolation of the user group in the list of user groups for space division multiplexing at the same time; or preferably selecting user group having relative good multiplexing effect corresponding to a certain condition.

The space division multiplexing can be realized just by processing of 101-104. In the above mentioned four steps, there are multiple different modes for specifically carrying out Step 102 and Step 103, and the construction of the user group for space division multiplexing in Step 103 is closely related to the calculation of space division isolation in Step 102. Hence, different calculation modes of space division isolation and methods for constructing the user group for space division multiplexing are described in detail in the follows, wherein each calculation mode serves as an embodiment. The processing of Step 101 and Step 104 in the method of the present invention is the same, for the respective different embodiments in the following. Thus, it will not be described repeatedly.

Embodiment 1

In this embodiment, the definition and calculation of space division isolation is conducted based on the capability of interference suppression; only two users are considered; the current mobile communication system does not have power control; the set space division isolation threshold is power ratio.

Space division isolation is calculated between each two of all the users or part of the users covered by the current base station. Here, the space division isolation of the two users refers to the interference suppressing performance to the signal of the user n when the signal of the desired user m is transmitted while being beamformed in the case of a given beamforming algorithm In uplink, the space division isolation of the user m to the user n refers to the power ratio of the received signal of the desired user m to that of the interference user n; in downlink, the space division isolation of the user m to the user n is defined as the power ratio of the desired signal (signal transmit from the base station to the user m) to the interfering signal (signal sent from the base station to the user n) received by user m.

The denotation $\overline{p}_{m,n}$ represents the received power of signal received by user n when base station is receiving user m's signal with the beamforming, $\overline{p}_{m,m}$ represents the received power of signal received by user m when the base station is receiving its signal with the beamformig, wherein the superbar represents that it is transmitted from the user terminal and received by the base station; likewise, $\underline{p}_{m,n}$ represents power of signal sent from the base station to the user n among signals received by a terminal held by the user m, $\underline{p}_{m,m}$ represents power of signal of the user m received by the terminal held by the user m, wherein the underline represents that it is transmitted from the base station and received by the user terminal. Thus, the uplink space division isolation of the user m to the user n can be represented as:

$$\overline{\Upsilon}_{m,n} = \frac{\overline{p}_{m,n}}{\overline{p}_{m,m}}$$

The downlink space division isolation of the user m to the user n can be represented as:

$$\underline{\Upsilon}_{m,n} = \frac{\underline{p}_{m,n}}{\underline{p}_{m,m}}$$

There are many modes for carrying out beamforming of interference suppression, such as singular value decomposition, Schmidt orthogonalization etc., which are commonly know for the person skilled in the art. Having obtained the estimation result of channel pulse response of the user, the beamforming weight coefficient $w_{m,n}$ of a certain user m for suppressing the other user n can be obtained by these methods for beamforming of interference suppression.

In a TDD system, the base station is capable of estimating the uplink and downlink multi-antenna channel of the user exactly, therefore, the beamforming of interference suppression can be conducted by the method of eigen-beamforming. As an example, it is described as follows:

$$w^{(m,n)} = \underset{w}{\operatorname{argmax}}\left(\frac{w^H R_{xx}^{(m)} w}{w^H R_{xx}^{(n)} w}\right) \quad (1)$$

The expression (1) means that w which causes the expression within the parentheses to take a maximum value is just the solution of that beamforming method, wherein $R_{xx}^{(m)}$ and $R_{xx}^{(n)}$ are respectively the space covariance matrixes of the user m and the user n calculated in Step 101. The expression (1) is a generalized eigenvalue problem, of which the solution is an eigenvector corresponding to the maximum generalized eigenvalue of a matrix group ($R_{xx}^{(m)}$, $R_{xx}^{(n)}$), which is also commonly known for the person skilled in the art. In addition, the expression (1) is general for uplink and downlink. In downlink, it means to make the ratio between the power of the signal received by the user m itself among the signals transmitted by the base station to the user m and the power of said signal received by the user n maximum.

Regarding estimation of the uplink and downlink space division isolations, according to the beamforming weight coefficient calculated and the channel impulse response estimated, the uplink space division isolation can be estimated as:

$$\overline{\Upsilon}_{m,n}^{(1)} = \frac{\overline{p}_{m,m}}{\overline{p}_{m,n}} = \frac{\overline{w}^{(m,n)H} \overline{R}_{xx}^{(m)} \overline{w}^{(m,n)}}{\overline{w}^{(m,n)H} \overline{R}_{xx}^{(n)} \overline{w}^{(m,n)}}$$

The downlink space division isolation can be estimated as:

$$\underline{\Upsilon}_{m,n}^{(1)} = \frac{\underline{p}_{m,m}}{\underline{p}_{m,n}} = \frac{\underline{w}^{(n,m)H} \underline{R}_{xx}^{(m)} \underline{w}^{(n,m)}}{\underline{w}^{(n,m)H} \underline{R}_{xx}^{(m)} \underline{w}^{(n,m)}}$$

Thus, the method for calculating space division isolation based on the capability of interference suppression is provided. It shall be clarified that the beamforming weight coefficient for the calculation of space division isolation can be calculated by any methods, and the calculation of isolation does not limit its method, for instance: beamforming based on direction of arrival (DOA) and beamforming based on the principle that the power is maximum, etc. As to the beamforming method considering interference suppression, the beamforming weight coefficients for different user's interference are different, hence the space division isolations are calculated in pairs. Therefore, as for the beamforming method only considering interference suppression of the current user without that of other users, the forming coefficient is only related to the channel information of the user itself but unrelated to the interfering user. The beamforming weight coefficient can be represented as:

$$\begin{cases} \overline{w}^{(m,n)} = \overline{w}^{(m)} \\ \underline{w}^{(m,n)} = \underline{w}^{(m)}, \end{cases} n = 1, \ldots, K$$

Correspondingly, the uplink space division isolation is:

$$\overline{\Upsilon}_{m,n}^{(1)} = \frac{\overline{p}_{m,m}}{\overline{p}_{m,n}} = \frac{\overline{w}^{(m)H} \overline{R}_{xx}^{(m)} \overline{w}^{(m)}}{\overline{w}^{(m)H} \overline{R}_{xx}^{(n)} \overline{w}^{(m)}}$$

The downlink space division isolation is:

$$\underline{\Upsilon}_{m,n}^{(1)} = \frac{\underline{p}_{m,m}}{\underline{p}_{m,n}} = \frac{\underline{w}^{(m)H} \underline{R}_{xx}^{(m)} \underline{w}^{(m)}}{\underline{w}^{(n)H} \underline{R}_{xx}^{(m)} \underline{w}^{(n)}}$$

The space division isolation calculated by interference suppression is power ratio and can be converted to dB value. the larger this value, the stronger the capability of interference between the two beamforming suppressed users sharing the same physical resource.

In this embodiment, corresponding set of user groups for space division isolation is obtained statistically through the formula (2):

$$\begin{cases} \overline{\Omega}^{(1)} = \left\{ \forall\, (m,n) \,\big|_{(|\overline{\Upsilon}_{m,n}^{(1)} \geq \overline{\Gamma}^{(1)} \& \overline{\Upsilon}_{n,m}^{(1)} \geq \overline{\Gamma}^{(1)}), m,n=1,\ldots,K \& m \neq n} \right\} \\ \underline{\Omega}^{(1)} = \left\{ \forall\, (m,n) \,\big|_{(|\underline{\Upsilon}_{m,n}^{(1)} \geq \underline{\Gamma}^{(1)} \& \underline{\Upsilon}_{n,m}^{(1)} \geq \underline{\Gamma}^{(1)}), m,n=1,\ldots,K \& m \neq n} \right\} \end{cases} \quad (2)$$

Wherein $\forall$ represents all elements satisfying conditions $\overline{\Upsilon}_{m,n}^{(1)}, \overline{\Upsilon}_{n,m}^{(1)}, \underline{\Upsilon}_{m,n}^{(1)}, \underline{\Upsilon}_{n,m}^{(1)}$ represent respectively uplink space division isolation of the user m to the user n, uplink space division isolation of the user n to the user m, downlink space division isolation of the user m to the user n, downlink space division isolation of the user n to the user m. $\overline{\Gamma}^{(1)}, \underline{\Gamma}^{(1)}$ represent respectively uplink space division isolation threshold, downlink space division isolation threshold.

Embodiment 2

In this embodiment, the definition and calculation of space division isolation is conducted based on the user's space power spectrum; only two users are considered; the current mobile communication system does not have power control; the set space division isolation threshold is absolute power value.

There are many methods for estimating the space power spectrum, a simple example is Bartlett spectrum, which is easy to calculate. Of course, in the present invention the method for defining and calculating the space division isolation of the user based on space power spectrum is not limited as Bartlett spectrum estimation, other methods such as Capon spectrum estimation, Music spectrum estimation etc. may also be applied. Here only the Bartlett spectrum is taken as an example.

The Bartlett normalization power spectrum is estimated as:

$$\begin{cases} \overline{p}_m(\varphi) = \dfrac{a^H(\varphi)\overline{R}_{xx}^{(m)}a(\varphi)}{\max(|a^H(\varphi)\overline{R}_{xx}^{(m)}a(\varphi)|)} \\ \underline{p}_m(\varphi) = \dfrac{a^H(\varphi)\underline{R}_{xx}^{(m)}a(\varphi)}{\max(|a^H(\varphi)\underline{R}_{xx}^{(m)}a(\varphi)|)} \end{cases}$$

Wherein $\varphi$ includes intervals in which the user may be distributed, for instance, it can be 0-360 degree for a direction-oriented base station and can be a range of 120 degree for a sector base station. The space division isolation can be defined based on the degree of approximation between the space power spectra of the two users. Here, an example is provided: as the downlink space division isolation is calculated similarly with the uplink space division isolation, here only the calculation of the uplink space division isolation is taken as an example. First, the power spectrum difference between the two users is calculated:

$$\Delta \overline{p}_{m,n}(\varphi) = \begin{cases} \overline{p}_m(\varphi) - \overline{p}_n(\varphi), & \text{if } \overline{p}_m(\varphi) \geq \overline{\varepsilon}_p \ \& \ \overline{p}_n(\varphi) \geq \overline{\varepsilon}_p \\ \overline{p}_m(\varphi), & \text{if } \overline{p}_m(\varphi) \geq \overline{\varepsilon}_p \ \& \ \overline{p}_n(\varphi) < \overline{\varepsilon}_p \\ \overline{p}_n(\varphi), & \text{if } \overline{p}_m(\varphi) < \overline{\varepsilon}_p \ \& \ \overline{p}_n(\varphi) \geq \overline{\varepsilon}_p \\ 0, & \text{if } \overline{p}_m(\varphi) < \overline{\varepsilon}_p \ \& \ \overline{p}_n(\varphi) < \overline{\varepsilon}_p \end{cases} \quad (3)$$

Wherein $\overline{\varepsilon}_p$ is calculation threshold of the power spectrum difference, i.e. only the power spectra exceeding said threshold take part in calculating the degree of approximation between the two users' power spectra, the formula (3) quantifies the degree of approximation between the power spectra. Based on the calculated power spectrum difference, the space division isolation between the two users can be defined as:

$$\overline{\Upsilon}_{m,n}^{(2)} = \int |\Delta \overline{p}_{m,n}(\varphi)| d\varphi$$

The definitions of the downlink power spectrum difference and space divisional isolation is similar with those of the uplink. Thus, the space division isolation between the two users can be estimated and defined by the space spectrum of the users, and the meaning of said isolation is the degree of approximation between the two users' space power spectra. The larger this value, the more inconsistent the space spectra of the two users are.

In this embodiment, corresponding set of user groups for space division isolation is obtained statistically through the formula (4):

$$\begin{cases} \overline{\Omega}^{(2)} = \left\{ \forall \, (m, n) \, |_{(|\overline{\Upsilon}_{m,n}^{(2)} \geq \Gamma^{(2)}|), m, n = 1, \ldots, K} \right\} \\ \underline{\Omega}^{(2)} = \left\{ \forall \, (m, n) \, |_{(|\underline{\Upsilon}_{m,n}^{(2)} \geq \underline{\Gamma}^{(2)}|), m, n = 1, \ldots, K} \right\} \end{cases}$$

Wherein $\forall$ represents all elements satisfying conditions, $\overline{\Upsilon}_{m,n}^{(2)}$, $\underline{\Upsilon}_{m,n}^{(2)}$ represent respectively uplink space division isolation of the user m to the user n or that of the user n to the user m and downlink space division isolation of the user m to the user n or that of the user n to the user m. In this embodiment, the space division isolations between the user m and the user n correspond to one another, that is, the space division isolation of the user m to the user n is consistent to that of the user n to the user m. $\overline{\Gamma}^{(2)}$, $\underline{\Gamma}^{(2)}$ represent respectively the uplink space division isolation threshold and the downlink space division isolation threshold.

Embodiment 3

In this embodiment, the definition and calculation of space division isolation is conducted based on the user's direction of arrival; only two users are considered; the current mobile communication system does not have power control; the set space division isolation threshold is angle of arrival.

The user's spatial angle of arrival is estimated based on the space power spectrum of the user. In Embodiment 2, many methods for estimating the user's space spectrum are described and the example of Bartlett spectrum estimation is provided, the user's direction of arrival can be defined as the direction in which the maximum value of the user's space power spectrum lies:

$$\varphi_m = \underset{\varphi}{\arg\max}(\overline{p}_m(\varphi))$$

The above formula means: $\varphi_m$ is $\varphi$ the that makes $\overline{p}_m(\varphi)$ maximum, which is just the direction of arrival of the use m. The user space division isolation defined based on the user's direction of arrival may be the two users' angle difference of arrival:

$$\overline{\Upsilon}_{m,n}^{(3)} = \begin{cases} |\varphi_m - \varphi_n|, & \text{if } |\varphi_m - \varphi_n| \leq 180° \\ 360° - |\varphi_m - \varphi_n|, & \text{else} \end{cases}$$

The physical meaning of the user's space division isolation defined based on the user's angle of arrival is: the difference of spatial distribution of the two users, and the unit is degree/radian which is the unit of the angle; the larger this value, the larger the angle isolation of the two users in space.

In this embodiment, corresponding set of user groups for space division isolation is obtained statistically through formula (5):

$$\begin{cases} \overline{\Omega}^{(3)} = \left\{ \forall \, (m, n) \, |_{(|\overline{\Upsilon}_{m,n}^{(3)} \geq \Gamma^{(3)}|), m, n = 1, \ldots, K} \right\} \\ \underline{\Omega}^{(3)} = \left\{ \forall \, (m, n) \, |_{(|\underline{\Upsilon}_{m,n}^{(3)} \geq \underline{\Gamma}^{(3)}|), m, n = 1, \ldots, K} \right\} \end{cases} \quad (5)$$

Wherein $\forall$ represents all elements satisfying conditions, $\overline{\Upsilon}_{m,n}^{(3)}$, $\underline{\Upsilon}_{m,n}^{(3)}$ represent respectively uplink space division isolation of the user m to the user n or that of the user n to the user m and downlink space division isolation of the user m to the user n or that of the user n to the user m. In this embodiment, the space division isolations between the user m and the user n correspond to one another, that is, the space division isolation of the user m to the user n is consistent to that of the user n to the user m. $\overline{\Gamma}^{(3)}$, $\underline{\Gamma}^{(3)}$ represent respectively the uplink space division isolation threshold and the downlink space division isolation threshold.

Embodiment 4

In this embodiment, the definition and calculation of space division isolation is conducted based on the capability of interference suppression; multiple users are considered; the current mobile communication system does not have power control; the set space division isolation threshold is power ratio.

Each user group for space division multiplexing contains more than two users, the calculation of the corresponding space division isolation and the construction of the user group for space division multiplexing should also be changed correspondingly. In the following only the uplink is taken as an example.

In this embodiment, the calculation of the space division isolation is not limited to the beamforming method. Taking the beamforming method for interference suppression among multiple users as an example, the beamforming coefficient among three users is calculated. Eigen beamforming algorithm is taken as an example in this embodiment and the specific form of the beamforming algorithm is not limited as long as the beamforming coefficient can be obtained.

$$\overline{w}^{(m,n,l)} = \arg\max_{w} \left( \frac{w^H \overline{R}_{xx}^{(m)} w}{w^H \left( \overline{R}_{xx}^{(n)} + \overline{R}_{xx}^{(l)} \right) w} \right)$$

$\overline{w}^{(m,n,l)}$ represents receiving signal from user m and suppressing signals from user n and l, $\overline{w}^{(n,m,l)}$ and $\overline{w}^{(l,m,n)}$ can be obtained by the same method, $\overline{w}^{(n,m,l)}$ and $\overline{w}^{(l,m,n)}$ respectively represent receiving signal from the user n and suppressing signals from the user m and the user/and receiving signal of the user/and suppressing signals from the user m and the user n, the same method can also be used for calculation of downlink.

Correspondingly, the uplink space division isolation can be calculated as:

$$\left\{ \overline{\Upsilon}_{m,n}^{(1)} = \frac{\overline{P}_{m,m}}{\overline{P}_{m,n}} = \frac{\overline{w}^{(m,n,l)H} \overline{R}_{xx}^{(m)} \overline{w}^{(m,n,l)}}{\overline{w}^{(m,n,l)H} \overline{R}_{xx}^{(n)} \overline{w}^{(m,n,l)}} \right.$$

As for the beamforming method only considering suppression of the current user without that of other users, the forming coefficient is only related to the channel information of the user itself but unrelated to the interfering users. $\overline{w}^{(m,n,l)}$ can be calculated by the formula (6):

$$\overline{w}^{(m,n,l)} = \arg\max_{w} \left( w^H \overline{R}_{xx}^{(m)} w \right) \quad (6)$$

The uplink/downlink space division isolation of a certain user to another user can still be calculated by the formula for calculating the space division isolation in Embodiment 1. Likewise, $\overline{\Upsilon}_{m,l}^{(1)}$, $\overline{\Upsilon}_{n,l}^{(1)}$, $\overline{\Upsilon}_{n,m}^{(1)}$, $\overline{\Upsilon}_{l,m}^{(1)}$ and $\overline{\Upsilon}_{l,n}^{(1)}$ can be obtained, and the downlink space division isolation can be calculated in the same way.

Correspondingly, the set of user groups for multi-user space division multiplexing is obtained statistically by the formula (7):

$$\overline{\Omega}^{(1)} = \{ \forall (m,n,l) |_{(\forall \overline{\Upsilon}_{m,n}^{(1)} \geq \Gamma^{(1)} \& \overline{\Upsilon}_{m,l}^{(1)} \geq \Gamma^{(1)} \& \overline{\Upsilon}_{n,l}^{(1)} \geq} $$
$$\Gamma^{(1)} \& \overline{\Upsilon}_{n,m}^{(1)} \geq \Gamma^{(1)} \& \overline{\Upsilon}_{l,n}^{(1)} \geq \Gamma^{(1)} \}_{,m,n=1,\ldots,K} \} \quad (7)$$

And the downlink can be obtained by a similar method.

Embodiment 5

In this embodiment, the definition and calculation of space division isolation is conducted based on the user's space power spectrum; multiple users are considered; the current mobile communication system does not have power control; the set space division isolation threshold is absolute power value.

In this embodiment, the estimation of the user's space power spectrum is the same as the method for calculating the space division isolation between two users. It is just necessary to obtain statistically the space division isolation between each two from the three users during calculation of the user group for multi-user space division multiplexing:

$$\overline{\Omega}^{(2)} = \{ \forall (m,n,l) |_{(\forall \overline{\Upsilon}_{m,n}^{(2)} \geq \Gamma^{(2)} \& \overline{\Upsilon}_{m,l}^{(2)} \geq \Gamma^{(2)} \& \overline{\Upsilon}_{n,l}^{(2)} \geq}$$
$$\Gamma^{(2)} \}_{,m,n=1,\ldots,K;m,n=1,\ldots,K} \}$$

And the downlink can be obtained by a similar method.

Embodiment 6

In this embodiment, the definition and calculation of space division isolation is conducted based on the user's direction of arrival; multiple users are considered; the current mobile communication system does not have power control; the set space division isolation threshold is angle of arrival.

In this embodiment, the estimation of the user's direction of arrival is the same as the method for calculating the space division isolation between two users. It is just necessary to obtain statistically the space division isolation between each two from the three users during calculation of the user group for multi-user space division multiplexing:

$$\overline{\Omega}^{(3)} = \{ \forall (m,n,l) |_{(\forall \overline{\Upsilon}_{m,n}^{(3)} \geq \Gamma^{(3)} \& \overline{\Upsilon}_{m,l}^{(3)} \geq \Gamma^{(3)} \& \overline{\Upsilon}_{n,l}^{(3)} \geq}$$
$$\Gamma^{(3)} \}_{,m,n=1,\ldots,K;m,n=1,\ldots,K} \}$$

And the downlink can be obtained by a similar method.

Embodiment 7

In this embodiment, the definition and calculation of space division isolation is conducted based on the capability of interference suppression; only two users are considered; the current mobile communication system has power control; the set space division isolation threshold is power ratio. Here, the so-called power control includes initialization power configuration for different terminals.

In this embodiment, the method described in Embodiment 1 can still be used as the method for calculating the space division isolation received by uplink.

As for a system conducting estimation of space covariance matrix in the mode of terminal feedback, the automatic gain control coefficient of the terminal should be removed from the space covariance matrix of the user fed back or the result of the channel impulse response. Supposed that the automatic gain control coefficient of the user k is $G_k$, then the space covariance matrix of the user fed back is:

$$\underline{R}_{xx}^{(k)} = E\{ \underline{H}^{(k)} \underline{H}^{(k)H} \} / G_k$$

In a TDD system, the downlink space covariance matrix is substituted by the space covariance matrix estimated in the uplink direction of the base station. Now the influence of the uplink transmit power should be removed from the method for calculating the downlink space division isolation in Embodiment 1, and the influence of the downlink transmit power should be taken in consideration. Supposed that the uplink transmit power of the user k is $\overline{p}_k$ and the downlink transmit power of the user k is $p_k$, and these values are acquired by the base station, then the space covariance matrix of the user is:

$$\underline{R}_{xx}^{(k)} = \frac{p_k}{\overline{p}_k} E\{ \underline{H}^{(k)} \underline{H}^{(k)H} \}$$

The calculation of the space division isolation and the statistic of the user group for the space division multiplexing are completely the same as in Embodiment 1.

Embodiment 8

In this embodiment, the definition and calculation of space division isolation is conducted based on the user's space power spectrum; only two users are considered; the current mobile communication system has power control; the set space division isolation threshold is absolute power value. Here the so-called power control includes initialization power configuration for different terminals.

In this embodiment, as it is impossible to consider the transmit power in calculation of space power spectrum, it is suggested in this embodiment to take the influence of uplink and downlink transmit power of different users in consideration under the construction of the user group for space division multiplexing. In this embodiment, the method for calculating the uplink and downlink space division isolation is the same as in Embodiment 2. Only the statistic of the user group for space division multiplexing is performed using the following mode:

$$\begin{cases} \overline{\Omega}^{(2)} = \left\{ \forall\ (m,n)\ |_{(|\overline{\Gamma}_{m,n}^{(2)} \geq \Gamma^{(2)} \& |\overline{p}_m - \overline{p}_n| \leq \delta_p),m,n=1,\ldots,K} \right\} \\ \underline{\Omega}^{(2)} = \left\{ \forall\ (m,n)\ |_{(|\underline{\Gamma}_{m,n}^{(2)} \geq \Gamma^{(2)} \& |\underline{p}_m - \underline{p}_n| \leq \delta_p),m,n=1,\ldots,K} \right\} \end{cases}$$

Embodiment 9

In this embodiment, the definition and calculation of space division isolation is conducted based on the user's direction of arrival; only two users are considered; the current mobile communication system has power control; the set space division isolation threshold is angle of arrival. Here the so-called power control includes initialization power configuration for different terminals.

In this embodiment, as it is impossible to consider the transmit power in calculation of the user's angle of arrival, it is suggested in this embodiment to take the influence of uplink and downlink transmit power of different users in consideration under the construction of the user group for space division multiplexing. In this embodiment, the method for calculating the uplink and downlink space division isolation is the same as in Embodiment 3. Only the statistic of the user group for space division multiplexing is performed using the following mode:

$$\begin{cases} \overline{\Omega}^{(3)} = \left\{ \forall\ (m,n)\ |_{(|\overline{\Gamma}_{m,n}^{(3)} \geq \Gamma^{(3)} \& |\overline{p}_m - \overline{p}_n| \leq \delta_p),m,n=1,\ldots,K} \right\} \\ \underline{\Omega}^{(3)} = \left\{ \forall\ (m,n)\ |_{(|\underline{\Gamma}_{m,n}^{(3)} \geq \Gamma^{(3)} \& |\underline{p}_m - \underline{p}_n| \leq \delta_p),m,n=1,\ldots,K} \right\} \end{cases}$$

Wherein $\overline{\delta}_p$ and $\underline{\delta}_p$ represent the thresholds of uplink/downlink power differences between the two users. The space division multiplexing algorithm can be applied only when the power difference between the two users is smaller than a certain value, otherwise, it is considered that the mutual interference therebetween exceeds the allowable value and the space division multiplexing cannot be conducted.

In Step 103 of FIG. 1, the establishment of a complete set of user groups for space division multiplexing is provided. The so-called complete set of user groups for space division multiplexing means that said set is obtained after all the possible cases are traversed. In other words, it refers to traversing all users covered by the current base station, calculating the space division isolation between each two users, determining all user groups in which the space divisional multiplexing is capable of being carried out by comparing the calculated space division isolation with a predetermined space division isolation threshold, and constituting the set of user groups for the space division multiplexing. The complete set of user groups for space division multiplexing can be updated in real time or periodically. However, there is a great deal of calculation to constitute the complete set of user groups for space division multiplexing. To reduce the calculation amount and the degree of complex, the present invention also allows establishing incomplete set of user groups for the space division multiplexing. The so-called incomplete set of user groups for the space division multiplexing means that the set of user groups for the space division multiplexing can be obtained without traversing all the users. Here, all the sets can be represented in the form of a list.

Establishing the list of the incomplete set of user groups for the space division multiplexing can be performed in the form of event triggering. The said event may be access of new user, user's switch, update of service and so on, including an event about adding resources. Establishing the list of the incomplete set of user groups for the space division multiplexing can be realized by using the following steps:

a. starting from an optional user to calculate space division isolation between a further optional user and said user according to the method of Step 102 and judge whether they can constitute a user group for space division multiplexing according to the method of Step 103, and listing them into the list of user group for space division multiplexing if so; else, directly executing step b;

b. conducting searches for other users after finishing the search of one user. Here, the number of users to be searched can be determined optionally as required.

The update of the list can be performed in real time or periodically. When the list is updated periodically, first it is checked whether the currently available user group in the list satisfies the conditions of Step 103, and then an optional user is selected randomly from the users not in the list to search, and the list of user groups is updated based on the calculation and estimation results.

For the mobile communication system nowadays and in the future, different terminals may have different capabilities and requirements, for instance: whether the terminal adopts multi-antenna, how the balancing algorithm of the terminal is like, the service state in which the terminal is and so on, all of these will lead to different demodulation capability and performance requirements. As for such case, different space division isolation thresholds can be set for different terminals.

For an optional terminal, uplink and downlink space division isolation thresholds can be set respectively as $\overline{\Gamma}^{(p,k)}$, p=1, 2, 3; k=1, ..., K and $\underline{\Gamma}^{(p,k)}$, p=1, 2, 3; k=1 ... K, wherein p is index of the selected space division isolation calculation method, k is index of user, the threshold represents that space division multiplexing can be conducted between the two users only when the space division isolation between different users reaches the threshold. Correspondingly, the statistic method of the user group of space division multiplexing in Step 103 is shown by the formula (8), and the calculation method is the same for different space division isolations:

$$\begin{cases} \overline{\Omega}^{(p)} = \left\{ \forall\ (m,n)\ |_{(|\overline{\Gamma}_{m,n}^{(p)} \geq \Gamma^{(p,m)} \& \overline{\Gamma}_{n,m}^{(p)} \geq \Gamma^{(p,n)}),m,n=1,\ldots,K\ \&\ m \neq n} \right\} \\ \underline{\Omega}^{(p)} = \left\{ \forall\ (m,n)\ |_{(|\underline{\Gamma}_{m,n}^{(p)} \geq \Gamma^{(p,m)} \& \underline{\Gamma}_{n,m}^{(p)} \geq \Gamma^{(p,n)}),m,n=1,\ldots,K\ \&\ m \neq n} \right\}, \end{cases} \quad (8)$$

$$p = 1, 2, 3$$

Figure 2:
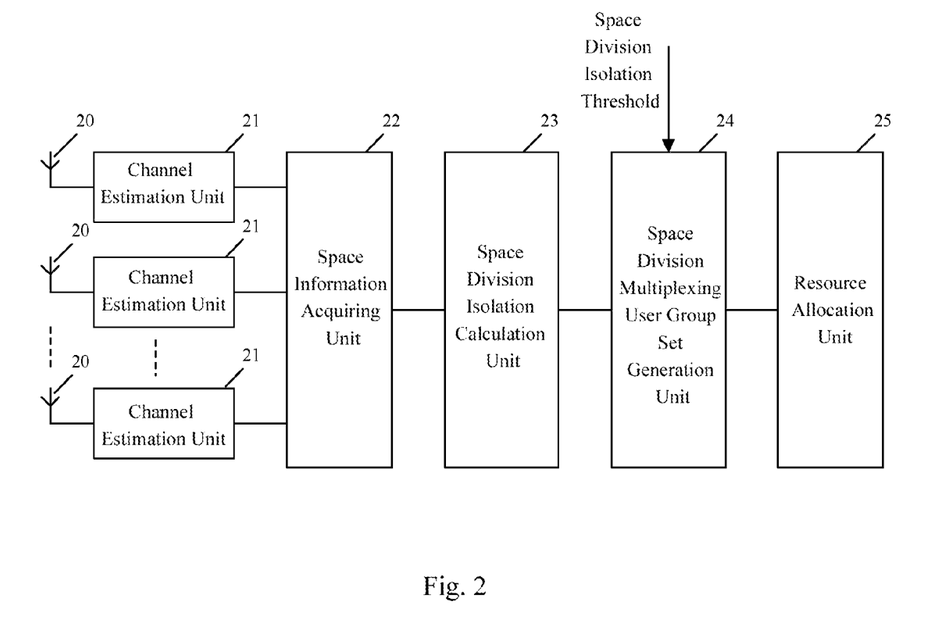
FIG. 2 is a schematic diagram of composition structure of the space division multiplexing apparatus according to the present invention.

In order to realize the above mentioned method of the present invention, the present invention further provides an apparatus for realizing space division multiplexing, as shown in FIG. 2, the apparatus comprises: antenna units 20, channel estimation units 21, space information acquiring unit 22, space division isolation calculation unit 23, space division multiplexing user group generation unit 24, and resource allocation unit 25.

Wherein the antenna unit 20 is antenna of the base station and configured to receive radio signals; each channel estimation unit 21 is configured to calculate uplink or downlink channel impulse response of the corresponding user based on the received signal and send the calculation result into the space information acquiring unit 22. The space information acquiring unit 22 calculates uplink or downlink space covariance matrix of the users based on the received channel impulse response; the space division isolation calculation unit 23 calculates the space division isolation between the users based on the acquired space covariance matrix; the space division multiplexing user group generation unit 24 determines user groups in which space divisional multiplexing is capable of being carried out based on the space division isolation between the users calculated by the space division isolation calculation unit 23 and a predetermined space division isolation threshold, so as to constitute a set of user groups for the space division multiplexing; the resource allocation unit 25 selects a user group from the space division multiplexing use group generation unit 24 and allocates share radio resource to the selected users.

The space information acquiring unit 22 further comprises uplink space covariance matrix calculation unit and downlink space covariance matrix calculation unit, respectively for calculating uplink and downlink space covariance matrixes. Said unit calculates the space division isolation in different modes in the system without power control and the system with power control, the specific calculation is conducted respectively according to Step 101 and the formula given in Embodiment 7.

In the present invention, there are mainly three methods for calculating space division isolation provided. Thus, as to different methods for calculating space division isolation, the space division isolation calculation unit 23 may have three constructions:

For the mode of calculating the space division isolation based on the capability of interference suppression, the space division isolation calculation unit 23 further comprises beamforming coefficient calculation unit, uplink space division isolation calculation unit, and downlink space division isolation calculation unit; wherein the beamforming coefficient calculation unit is configured to calculate beamforming weight coefficient of a user for suppressing another user and send the calculated beamforming weight coefficient respectively to the uplink space division isolation calculation unit and the downlink space division isolation calculation unit; the uplink space division isolation calculation unit and the downlink space division isolation calculation unit respectively calculate uplink and downlink space division isolation between the users based on the obtained beamforming weight coefficient and channel impulse response.

For the mode of calculating the space division isolation based on the space power spectrum of the users, the space division isolation calculation unit 23 further comprises power spectrum estimation unit, power spectrum difference calculation unit, and space division isolation calculation module; wherein the power spectrum estimation unit conducts power spectrum estimation, various spectrum estimation methods such as Bartlett spectrum estimation, Capon spectrum estimation, Music spectrum estimation etc. can be adopted; the power spectrum difference calculation unit calculates power spectrum difference between two users based on the estimated power spectrum of each user; the space division isolation calculation module calculates the space division isolation between the two users based on the calculated power spectrum difference.

For the mode of calculating the space division isolation based on the user's direction of arrival, the space division isolation calculation unit 23 further comprises power spectrum estimation unit, direction of arrival determination unit, and angle difference of arrival calculation unit; wherein the power spectrum estimation unit conducts power spectrum estimation, various spectrum estimation methods such as Bartlett spectrum estimation, Capon spectrum estimation, Music spectrum estimation etc. can be adopted; the direction of arrival determination unit determines the direction in which the maximum value of power spectrum lies as corresponding user's direction of arrival based on result of the power spectrum estimation; the angle difference of arrival calculation unit is configured to calculate angle difference of arrival between the two users and take the calculation result as the space division isolation of the two users.

In the apparatus of the present invention, the space division multiplexing user group generation unit 24 may further comprise space division isolation comparison unit and space division multiplexing user group storage unit; wherein the space division isolation comparison unit receives the space division isolation between the users calculated by the space division isolation calculation unit 23 and, at the same time, receives or read the space division isolation threshold, compares the two values and sends the user group larger than or equal to the threshold into the space division multiplexing user group storage unit for saving; the space division multiplexing user group storage unit saves all user groups having been compared and being larger than or equal to the space division isolation threshold, so as to constitute the set of the user groups for the space division multiplexing which could be saved in the form of a list.

The apparatus of the present invention may further comprise space division multiplexing user group updating unit for updating the set of the user groups for the space division multiplexing or the list in real time or periodically as required, and determining whether it is necessary to remove existing user group or to add new user group.

All the above described are only preferable embodiment of the present invention, and shall not be construed as limiting the scope of protection of the present invention.

FIG. 1
101 Acquiring Space Information of Users
102 Calculating Space Division Isolation between the Users based on the Acquired Space Covariance Matrix
103 Generating a Set of user groups for the Space Division Multiplexing based on the Calculated Space Division Isolation between the Users
104 Selecting Users for the Space Division Multiplexing, Allocating Physical Resources to the Selected Users For Multiplexing FIG. 2
21 Channel Estimation Unit
22 Space Information Acquiring Unit
23 Space Division Isolation Calculation Unit
↓ Space Division Isolation Threshold
24 Space Division Multiplexing User Group Set Generation Unit
25 Resource Allocation Unit

What is claimed is:

1. A method for realizing space division multiplexing, wherein the method comprises steps as follows:
   A. acquiring space information of users, and calculating space division isolation between the users based on the acquired space information;
   B. generating a set of user groups for the space division multiplexing based on the space division isolation between users calculated in step A;
   C. selecting a user group from the set of user groups for the space division multiplexing generated in step B and allocating the same physical resource to two users among the selected user group when conducting the space division multiplexing, wherein the space information in step A is space covariance matrix; the space covariance matrix includes uplink space covariance matrix $\overline{R}_{xx}{}^{(k)}$ and downlink space covariance matrix $R_{xx}{}^{(K)}$ which are calculated respectively based on $\overline{R}_{xx}{}^{(K)}=E\{\overline{H}^{(K)}\overline{H}^{(k)H}\}$ and $R_{xx}{}^{(k)}=E\{H^{(k)}H^{(k)H}\}$, wherein $E\{\bullet\}$ represents taking an average value of random variables, $(\bullet)^H$ represents conjugating and transposing the matrix, $\overline{H}^{(k)}$ represents the multi-antennae uplink channel pulse response, $\overline{H}^{(k)H}$ represents conjugating and transposing the multi-antennae uplink channel pulse response, $H^{(K)}$ represents the multi-antennae downlink channel pulse response, $H^{(K)H}$ represents conjugating and transposing the multi-antennae downlink channel pulse response.

2. The method according to claim 1, wherein the users are two users; the space information is space covariance matrix; and the space division isolation includes a uplink space division isolation and a downlink space division isolation;

the calculation of space division isolation between the users in step A refers to calculating the space division isolation between the users based on capability of interference suppression, specifically including steps as follows:

A11. calculating beamforming weight coefficient $w_{m,n}$ of a user m for suppressing a user n;

A12. calculating the uplink space division isolation and downlink space division isolation respectively by the formulae $$\overline{\Upsilon}_{m,n}^{(1)} = \frac{\overline{p}_{m,m}}{\overline{p}_{m,n}} = \frac{\overline{w}^{(m,n)H}\overline{R}_{xx}^{(m)}\overline{w}^{(m,n)}}{\overline{w}^{(m,n)H}\overline{R}_{xx}^{(n)}\overline{w}^{(m,n)}} \text{ and }$$

$$\Upsilon_{m,n}^{(1)} = \frac{p_{m,m}}{p_{m,n}} = \frac{w^{(n,m)H}R_{xx}^{(m)}w^{(n,m)}}{w^{(m,n)H}R_{xx}^{(m)}w^{(m,n)}}$$

based on the beamforming weight coefficient calculated in step A11 and estimated channel impulse response; wherein $\overline{p}_{m,n}$ represents signal power transmitted by user n and received by the base station with beamforming when the base station is receiving signal from user m, $\overline{w}^{(m,n)}$ and $\overline{w}^{(m,n)}$ represent the beamforming weight coefficients, $\overline{R}_{xx}^{(m)}$ represents the space covariance matrix of the user feed back, $\overline{p}_{m,n}$ represents signal power transmitted by the user m and received by base station when the base station is receiving signals from the user m with beamforming, $p_{m,n}$ represents signal power transmitted by the base station to the user n and received by a terminal of the user m, and $p_{m,m}$ represents signal power received by base station when the base station is receiving signals from the terminal of the user m with beamforming;

and the generation of the set of user groups for the space division multiplexing in step B is obtained statistically based on $$\begin{cases} \overline{\Omega}^{(1)} = \left\{\forall\,(m,n)\,|_{(|\overline{\Upsilon}_{m,n}^{(1)}\geq\overline{\Gamma}^{(1)}\&\overline{\Upsilon}_{n,m}^{(1)}\geq\overline{\Gamma}^{(1)}),m,n=1,\ldots,K\&m\neq n)}\right\} \\ \Omega^{(1)} = \left\{\forall\,(m,n)\,|_{(|\Upsilon_{m,n}^{(1)}\geq\Gamma^{(1)}\&\Upsilon_{n,m}^{(1)}\geq\Gamma^{(1)}),m,n=1,\ldots,K\&m\neq n)}\right\} \end{cases}$$

wherein $\forall$ represents all elements satisfying conditions, $\overline{\Upsilon}_{m,n}^{(1)}$, $\overline{\Upsilon}_{n,m}^{(1)}$, $\Upsilon_{m,n}^{(1)}$, $\Upsilon_{n,m}^{(1)}$, represent respectively uplink space division isolation of the user m to the user n, uplink space division isolation of the user n to the user m, downlink space division isolation of the user m to the user n, downlink space division isolation of the user n to the user m; and $\overline{\Gamma}^{(1)}$, $\Gamma^{(1)}$ represent respectively uplink space division isolation threshold, downlink space division isolation threshold.

3. The method according to claim 1, wherein the user are two users; and the calculation of the space division isolation between users in step A refers to calculating the space division isolation between users based on power spectrum of user space, specifically including steps as follows:

A21. estimating power spectrum of each user;

A22. calculating power spectrum difference between the two users based on the formula $$\Delta\overline{p}_{m,n}(\varphi) = \begin{cases} \overline{p}_m(\varphi)-\overline{p}_n(\varphi), & \text{if } \overline{p}_m(\varphi)\geq\overline{\varepsilon}_p \,\&\, \overline{p}_n(\varphi)\geq\overline{\varepsilon}_p \\ \overline{p}_m(\varphi), & \text{if } \overline{p}_m(\varphi)\geq\overline{\varepsilon}_p \,\&\, \overline{p}_n(\varphi)<\overline{\varepsilon}_p \\ \overline{p}_n(\varphi), & \text{if } \overline{p}_m(\varphi)<\overline{\varepsilon}_p \,\&\, \overline{p}_n(\varphi)\geq\overline{\varepsilon}_p \\ 0, & \text{if } \overline{p}_m(\varphi)<\overline{\varepsilon}_p \,\&\, \overline{p}_n(\varphi)<\overline{\varepsilon}_p, \end{cases}$$

wherein $\overline{\varepsilon}_p$, is calculation threshold of the power spectrum difference;

A23. calculating the space division isolation between the users based on the formula $$\overline{\Upsilon}_{m,n}^{(2)}=\int|\Delta\overline{p}_{m,n}(\phi)|d\phi;$$

and the generation of the set of the user group for space division multiplexing in step B is obtained statistically based on $$\begin{cases} \overline{\Omega}^{(2)} = \left\{\forall\,(m,n)\,|_{(|\overline{\Upsilon}_{m,n}^{(2)}\geq\overline{\Gamma}^{(2)}),m,n=1,\ldots,K\}}\right\} \\ \Omega^{(2)} = \left\{\forall\,(m,n)\,|_{(|\Upsilon_{m,n}^{(2)}\geq\Gamma^{(2)}),m,n=1,\ldots,K\}}\right\} \end{cases} \text{ or}$$

$$\begin{cases} \overline{\Omega}^{(2)} = \left\{\forall\,(m,n)\,|_{(|\overline{\Upsilon}_{m,n}^{(2)}\geq\overline{\Gamma}^{(2)}\,\&\,|\overline{p}_m-\overline{p}_n|\leq\delta_p),m,n=1,\ldots,K\}}\right\} \\ \Omega^{(2)} = \left\{\forall\,(m,n)\,|_{(|\Upsilon_{m,n}^{(2)}\geq\Gamma^{(2)}\,\&\,|p_m-p_n|\leq\delta_p),m,n=1,\ldots,K\}}\right\}, \end{cases}$$

wherein $\overline{\Upsilon}_{m,n}^{(2)}$, $\Upsilon_{m,n}^{(2)}$ represent respectively uplink space division isolation of the user m to the user n or that of the user n to the user m and downlink space division isolation of the user m to the user n or that of the user n to the user m, $\overline{p}_m(\phi)$ and $\overline{p}_n(\phi)$ represent the power spectrum of two users", "$\overline{\Gamma}^{(2)}$" represents the uplink space division isolation threshold, $\forall$ represents all elements satisfying conditions, and $\overline{p}_m$ and $\overline{p}_n$ represent the uplink transmit power of the two users.

4. The method according to claim 1, wherein the users are two users; and the calculation of the space division isolation between the users in step A refers to calculating the space division isolation between the users based on user's direction of arrival, specifically including steps as follows:

A31. estimating power spectrum of each user;

A32. determining the direction in which the maximum value of power spectrum lies as the user's direction of arrival;

A33. calculating angle difference of arrival between the two users as the space division isolation between the users;

and the generation of the set of user groups for the space division multiplexing in step B is obtained statistically based on $$\begin{cases} \overline{\Omega}^{(3)} = \left\{ \forall\,(m,n)\,|_{\left(|\overline{\Upsilon}_{m,n}^{(3)}|\geq\Gamma^{(3)}\right),m,n=1,\ldots,K} \right\} \\ \underline{\Omega}^{(3)} = \left\{ \forall\,(m,n)\,|_{\left(|\underline{\Upsilon}_{m,n}^{(3)}|\geq\Gamma^{(3)}\right),m,n=1,\ldots,K} \right\} \end{cases} \text{ or}$$

$$\begin{cases} \overline{\Omega}^{(3)} = \left\{ \forall\,(m,n)\,|_{\left(|\overline{\Upsilon}_{m,n}^{(3)}|\geq\Gamma^{(3)}\,\&\,|\overline{p}_m-\overline{p}_n|\leq\delta_p\right),m,n=1,\ldots,K} \right\} \\ \underline{\Omega}^{(3)} = \left\{ \forall\,(m,n)\,|_{\left(|\underline{\Upsilon}_{m,n}^{(3)}|\geq\Gamma^{(3)}\,\&\,|\underline{p}_m-\underline{p}_n|\leq\delta_p\right),m,n=1,\ldots,K} \right\} \end{cases},$$

wherein $\overline{\Upsilon}_{m,n}^{(3)}$ represents uplink space division isolation of the user m to the user n or the user n to the user m, $\Gamma^{(3)}$ represents the uplink space division isolation threshold, $\forall$ represents all elements satisfying conditions, and $\overline{p}_m$ and $\overline{p}_n$ represent the uplink transmit power of the two users" and "space division isolation of users can be defined by $$\overline{\Upsilon}_{m,n}^{(3)} = \begin{cases} |\varphi_m - \varphi_n|, & \text{if } |\varphi_m - \varphi_n| \leq 180° \\ 360° - |\varphi_m - \varphi_n|, & \text{else}. \end{cases}$$

5. The method according to claim 1, wherein the users are multiple users;

and the calculation of the space division isolation between users in step A refers to calculating the space division isolation between the users based on capability of interference suppression, specifically including steps as follows:

A41. calculating beamforming weight coefficient of each user for suppressing the other users;

A42. calculating the uplink space division isolation or downlink space division isolation respectively, based on the beamforming weight coefficient calculated in step A41 and the obtained channel impulse response.

6. The method according to claim 1, wherein the space information in step A is space covariance matrix; the space covariance matrix includes uplink space covariance matrix $\overline{R}_{xx}^{(K)}$ and downlink space covariance matrix $\underline{R}_{xx}^{(K)}$; the uplink space covariance matrix $\overline{R}_{xx}^{(K)}$ is calculated based on $\overline{R}_{xx}^{(k)} = E\{\overline{H}^{(k)}\overline{H}^{(k)H}\}$; the downlink space covariance matrix $\underline{R}_{xx}^{(K)}$ is calculated based on $\underline{R}_{xx}^{(k)} = E\{\underline{H}^{(k)}\underline{H}^{(k)H}\}/G_K$ or $$\underline{R}_{xx}^{(k)} = \frac{\overline{p}_k}{\underline{p}_k} E\{\underline{H}^{(k)}\underline{H}^{(k)H}\},$$

wherein $G_k$ is automatic gain control coefficient of a user k, $\overline{p}_k$ is uplink transmit power of the user k, and $\underline{p}_k$ is downlink transmit power of the user k, $\overline{H}^{(k)}$ represents the multi-antennae uplink channel pulse response, $\overline{H}^{(k)H}$ represents conjugating and transposing the multi-antennae uplink channel pulse response, $\underline{H}^{(k)}$ represents the multi-antennae downlink channel pulse response, $\underline{H}^{(k)H}$ represents conjugating and transposing the multi-antennae downlink channel pulse response.

7. The method according to claim 1, wherein the generation of the set of user groups for the space division multiplexing in step B refers to: traversing all users covered by the current base station, calculating the space division isolation between each two users, determining all user groups in which the space divisional multiplexing is capable of being carried out by comparing the calculated space division isolation with a predetermined space division isolation threshold, and constituting the set of user groups for the space division multiplexing;

or refers to: by triggering events, traversing part of users covered by the current base station starting from a random user, calculating the space division isolation between users, determining user groups in which space divisional multiplexing is capable of being carried out by comparing the calculated space division isolation with a predetermined space division isolation threshold, so as to constitute the set of user groups for the space division multiplexing.

8. The method according to claim 1, wherein the method further comprises: updating the set of user groups for the space division multiplexing in real time or periodically.

9. The method according to claim 1, wherein the method further comprises: predetermining uplink and downlink space division isolation thresholds $\overline{\Gamma}^{(p)}$, p=1,2,3 and $\underline{\Gamma}^{(p)}$, p=1,2,3 wherein p is index of the selected space division isolation calculation method; and the space division isolation thresholds are ratios of power, absolute power values, or angles of arrival.

10. The method according to claim 1, wherein the method further comprises: setting different uplink and downlink space division isolation thresholds $\overline{\Gamma}^{(p,k)}$, p=1,2,3; k=1,...,K and $\underline{\Gamma}^{(p,k)}$, p=1,2,3,... K for different terminals, wherein p is index of the selected space division isolation calculation method, k is index of users; and the space division isolation thresholds are ratios of power, absolute power values, or angles of arrival.

11. The method according to claim 10, wherein the generation of the set of user groups for the space division multiplexing in step B refers to: the generation based on $$\begin{cases} \overline{\Omega}^{(p)} = \left\{ \forall\,(m,n)\,|_{\left(|\overline{\Upsilon}_{m,n}^{(p)}|\geq\overline{\Gamma}^{(p,m)}\,\&\,\overline{\Upsilon}_{n,m}^{(p)}\geq\overline{\Gamma}^{(p,n)}\right),m,n=1,\ldots,K\,\&\,m\neq n} \right\} \\ \underline{\Omega}^{(p)} = \left\{ \forall\,(m,n)\,|_{\left(|\underline{\Upsilon}_{m,n}^{(p)}|\geq\underline{\Gamma}^{(p,m)}\,\&\,\underline{\Upsilon}_{n,m}^{(p)}\geq\underline{\Gamma}^{(p,n)}\right),m,n=1,\ldots,K\,\&\,m\neq n} \right\}, \end{cases}$$

p=1,2,3.

* * * * *